United States Patent
Patel et al.

(10) Patent No.: US 11,171,429 B2
(45) Date of Patent: Nov. 9, 2021

(54) TERMINAL BLOCK ASSEMBLIES

(71) Applicant: Hamilton Sundstrand Corporation, Charlotte, NC (US)

(72) Inventors: Dhaval Patel, Schaumburg, IL (US); Craig J. Wojcik, Evansville, WI (US); Edward C. Allen, Davis, IL (US); Skyler Ripplinger, Rockford, IL (US); Ted A. Martin, Winnebago, IL (US); Duane C. Johnson, Beloit, WI (US); Doren Smith, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/736,384

(22) Filed: Jan. 7, 2020

(65) Prior Publication Data

US 2021/0210877 A1 Jul. 8, 2021

(51) Int. Cl.
*H01R 9/24* (2006.01)
*H01R 43/02* (2006.01)
*H01R 43/24* (2006.01)
*H02K 5/22* (2006.01)

(52) U.S. Cl.
CPC ........... *H01R 9/2416* (2013.01); *H01R 43/02* (2013.01); *H01R 43/24* (2013.01); *H01R 2201/10* (2013.01); *H02K 5/225* (2013.01)

(58) Field of Classification Search
CPC ........ H01R 9/2416; H01R 9/24; H01R 43/02; H01R 43/24; H01R 43/20; H01R 2201/10; H02K 5/225; H02K 5/22; H02K 5/00

USPC .................................................. 439/722, 709
See application file for complete search history.

(56) References Cited

U.S. PATENT DOCUMENTS

| | | | | | |
|---|---|---|---|---|---|
| 4,580,003 | A | * | 4/1986 | Bowsky | H01B 17/305 174/152 GM |
| 4,712,029 | A | * | 12/1987 | Nold | H02K 5/225 174/15.3 |
| 8,052,477 | B1 | * | 11/2011 | Ko | H01R 13/6582 439/660 |
| 9,071,101 | B2 | * | 6/2015 | Patel | H02K 15/0062 |
| 9,337,700 | B2 | | 5/2016 | Patel et al. | |
| 10,644,563 | B2 | * | 5/2020 | Hochstetler | H02K 7/116 |
| 2003/0203673 | A1 | * | 10/2003 | Doherty | H02K 5/225 439/559 |
| 2008/0233807 | A1 | * | 9/2008 | Newton | H01R 13/745 439/709 |
| 2010/0253164 | A1 | | 10/2010 | Chamberlin et al. | |

(Continued)

OTHER PUBLICATIONS

Extended European Search Report for European Patent Application No. EP21150612.6, dated Jun. 15, 2021.

*Primary Examiner* — Harshad C Patel
(74) *Attorney, Agent, or Firm* — Locke Lord LLP; Joshua L. Jones; Scott D. Wofsy

(57) ABSTRACT

A terminal assembly includes a terminal block of a dielectric material defining a plurality of bores therethrough. A respective terminal contact of an electrically conductive material is seated in each of the respective bores. The terminal contact defines a longitudinal axis therethrough with a terminal bore defined through the terminal contact along the longitudinal axis. A divider wall separates the terminal bore into a solder cup for a lead wire on an interior side of the terminal bore, and a lug receptacle on an exterior side of the terminal bore.

13 Claims, 3 Drawing Sheets

(56) References Cited

U.S. PATENT DOCUMENTS

| | | | |
|---|---|---|---|
| 2012/0133224 A1* | 5/2012 | Grosskopf | H01R 9/24 |
| | | | 310/71 |
| 2012/0228970 A1* | 9/2012 | Patel | H02K 5/225 |
| | | | 310/71 |
| 2015/0024641 A1 | 1/2015 | Lascelles et al. | |
| 2019/0165499 A1* | 5/2019 | Horwath | H01R 13/5202 |
| 2019/0214881 A1* | 7/2019 | Hochstetler | F02C 7/32 |
| 2019/0222092 A1* | 7/2019 | Hochstetler | H02K 5/225 |

\* cited by examiner

TERMINAL BLOCK ASSEMBLIES

BACKGROUND

1. Field

The present disclosure relates to rotating electrical machines such as high speed starter generators for gas turbine engines and, more particularly, to a terminal board assembly used to transmit electrical energy therefor.

2. Description of Related Art

An aircraft may include various types of rotating electrical machines such as, for example, generators, motors, and starter/generators. Starter/generators may be operated as either a starter or a generator. The electrical power output from, or supplied to, the starter-generator may be communicated via one or more terminal assemblies. Each terminal assembly may include feedthroughs that are coupled to stator output leads within the generator housing and to a terminal block assembly outside of the generator housing. Terminal assemblies are designed to provide various clearances, such as "strike" performance, breakthrough performance and creepage performance. Creepage is typically the shortest path between two conductive components or between a conductive component and a bounding surface measured along the surface of the insulating material. A proper and adequate creepage distance protects against tracking, a process that produces a partially conducting path of localized deterioration on the surface of the insulating material as a result of electric discharges on or close to an insulation surface. In some instances, collection of foreign object debris near the terminal assembly may potentially affect performance with regards to clearance and creepage.

The conventional techniques have been considered satisfactory for their intended purpose. However, there is an ever present need for improved systems and methods for terminal board assemblies. This disclosure provides a solution for this need.

SUMMARY

A terminal assembly includes a terminal block of a dielectric material defining a plurality of bores therethrough. A respective terminal contact of an electrically conductive material is seated in each of the respective bores. The terminal contact defines a longitudinal axis therethrough with a terminal bore defined through the terminal contact along the longitudinal axis. A divider wall separates the terminal bore into a solder cup for a lead wire on an interior side of the terminal bore, and a lug receptacle on an exterior side of the terminal bore.

A respective locking helical insert can be seated in the lug receptacle of each respective terminal contact, wherein the locking helical insert is configured to mechanically secure a respective lug to each terminal contact with a respective bolt threaded into each locking helical insert. The respective lug can be electrically and mechanically connected to each lug receptacle. Each terminal contact can have an exterior facing pad in the form of a radially extending flange seated on an exterior surface of the terminal block for electrical contact with a respective lug. A respective lead wire can be soldered or brazed into each solder cup. Each respective lead wire can be connected to an electrical machine stator on an interior side of the terminal bores.

An electrical machine housing can be included, wherein the terminal block is mounted to the electrical machine housing with each respective lug receptacle facing outward toward an exterior of the electrical machine housing. A respective o-ring can be seated about an exterior barrel of each of the bores through the terminal block, wherein the o-ring seals between the electrical machine housing and the terminal block. The terminal block can insulate between the housing and each terminal contact.

The terminal block can be a single, monolithic, unitary body. The dielectric material can be plastic, such as polyamide-imides or polyimide-based plastic. The terminal block can include a respective terminal divider between each adjacent pair of the plurality of bores and extending in an outward direction, opposite a direction in which the plurality of bores extend.

A method includes molding a plurality of electrically conductive terminal contacts into a dielectric terminal block. The method includes mounting the terminal block to an electrical machine housing. Mounting the terminal block to an electrical machine housing can include soldering or brazing a respective lead wire into a solder cup of each of the terminal contacts, wherein each respective lead wire is a lead wire of a stator of an electrical machine inside the housing.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
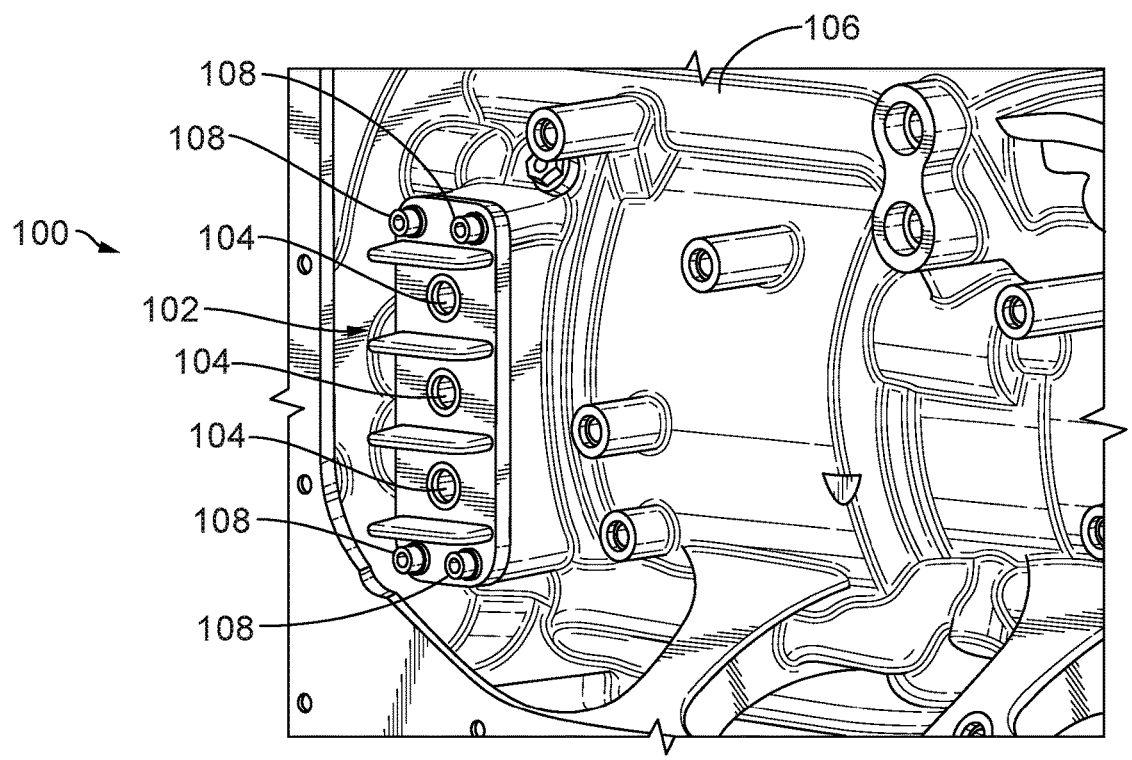
FIG. 1 is a schematic perspective view of an embodiment of a terminal block constructed in accordance with the present disclosure, showing the terminal block mounted to the electrical machine housing from an exterior view.
Figure 2:
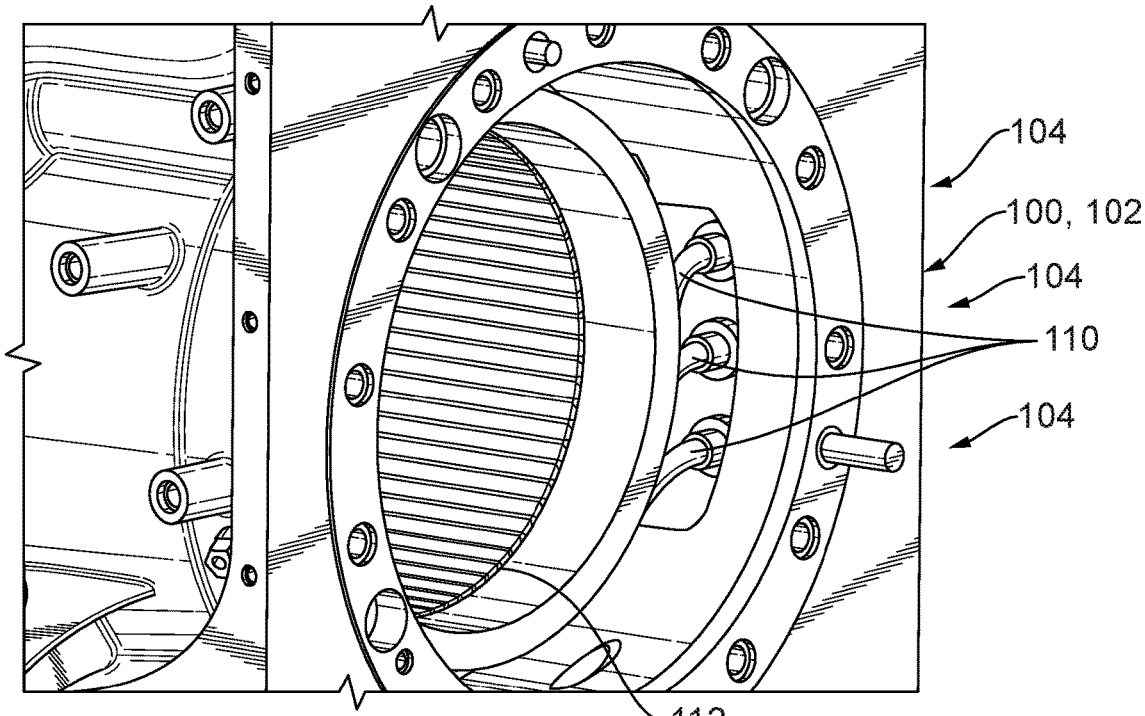
FIG. 2 is a schematic perspective view of the terminal block of FIG. 1, showing the terminal block mounted to the electrical machine housing from an interior view.

Reference will now be made to the drawings wherein like reference numerals identify similar structural features or aspects of the subject disclosure. For purposes of explanation and illustration, and not limitation, a partial view of an embodiment of a terminal block assembly in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to electrically connect aircraft electrical systems to onboard electrical machines such as generators.

The terminal assembly 100 includes a terminal block 102 of a dielectric material defining a plurality of bores 104 therethrough. The terminal block 102 is mounted to an electrical machine housing 106 with the four fasteners 108. As shown from the inside in FIG. 2, each respective lead wire 110 of the stator 112 in the electrical machine housing 106 connects an electrical machine stator 112 to an interior side of the terminal bores 104 of the terminal block 102.

Figure 3:
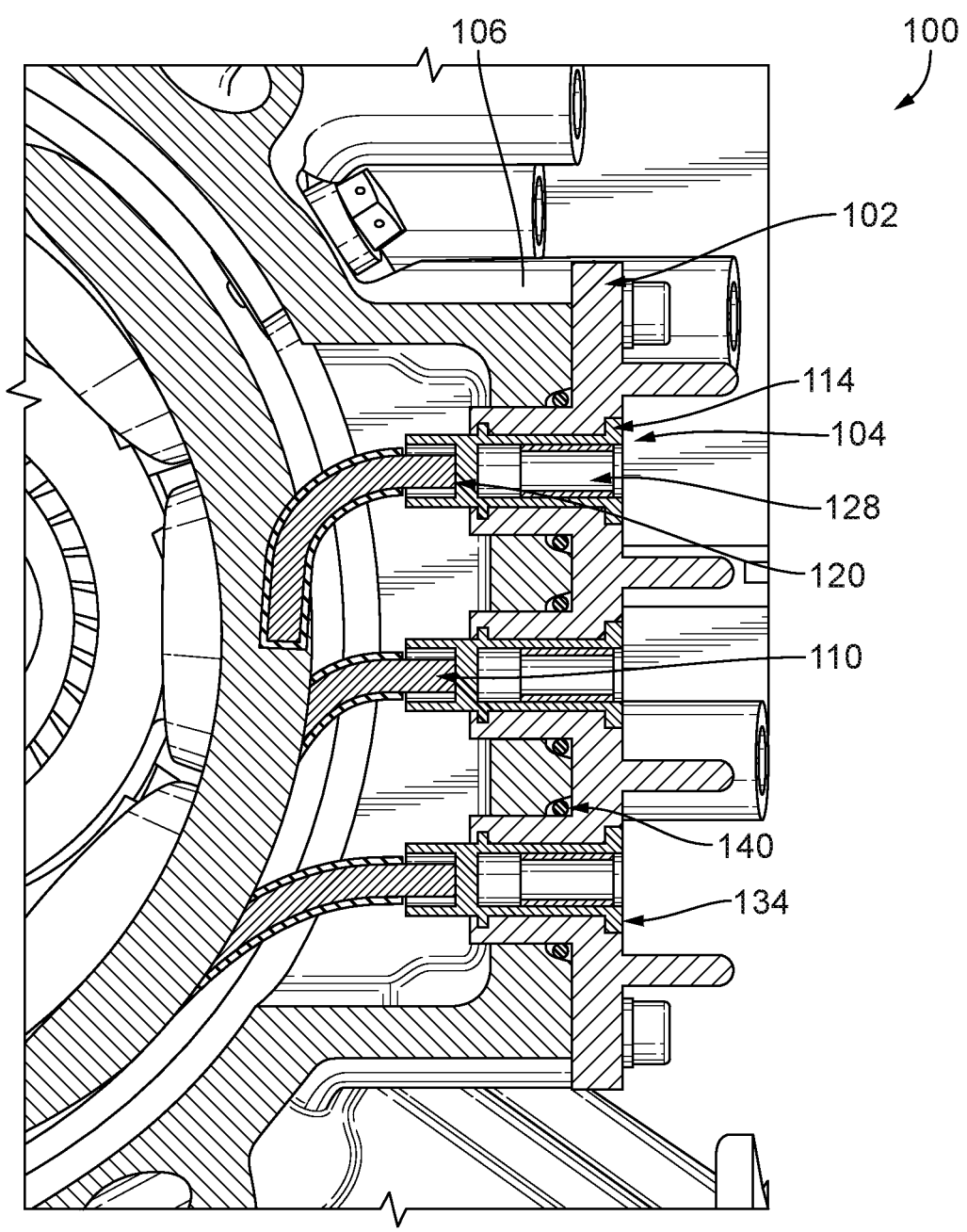
FIG. 3 is a cross-sectional side elevation view of the terminal block of FIG. 1.
Figure 4:
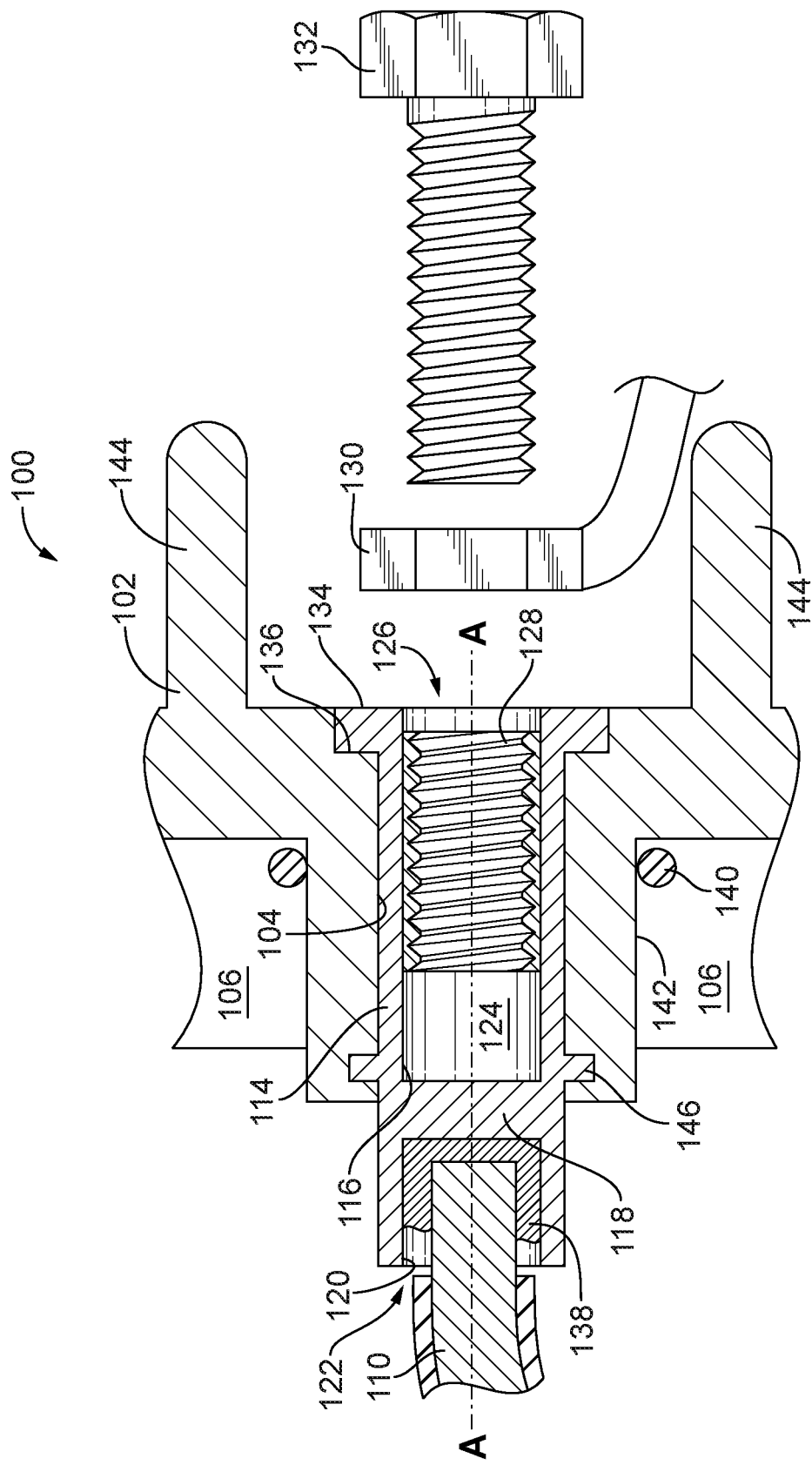
FIG. 4 is a cross-sectional side elevation view of a portion of the terminal block of FIG. 3, showing one of the terminal contacts.

With reference now to FIGS. 3-4, a respective terminal contact 114 of an electrically conductive material is seated in each of the respective bores 104. The terminal contact 114 defines a longitudinal axis A (labeled in FIG. 4) therethrough with a terminal bore 116 defined through the terminal contact 114 along the longitudinal axis A. A divider wall 118 separates the terminal bore 116 into a solder cup 120 for a lead wire 110 on an interior side 122 of the terminal bore 116, and a lug receptacle 124 on an exterior side 126 of the terminal bore 116 (each respective lug receptacle 124 faces outward toward an exterior of the electrical machine housing 106).

A respective locking helical insert 128 is seated in the lug receptacle 124 of each respective terminal contact 114, wherein the locking helical insert 128 is configured to mechanically secure a respective lug 130 to each terminal contact 114 with a respective bolt 132 passing through the lug and threaded into each locking helical insert 128. The respective lug 130 (with its associated wire) is both electrically and mechanically connected to each lug receptacle 124. Each terminal contact 114 as an exterior facing pad 134 in the form of a radially extending flange seated on an exterior surface 136 of the terminal block 102 for electrical contact with a respective lug 130. On the other side of the divider wall 118, a respective lead wire 110 is soldered or brazed into each solder cup 120, and the solder or braze 138 is shown schematically in FIG. 3.

With continued reference to FIG. 3, a respective o-ring 140 is seated about an exterior barrel 142 of each of the bores 104 through the terminal block 102, wherein the o-ring 140 seals as a face seal between the electrical machine housing 106 and the terminal block 102. The terminal block 102 electrically insulates between the housing 106 and each terminal contact 114. The terminal block 102 is a single, monolithic, unitary body. The dielectric material of the terminal block 102 can be plastic, such as polyamide-imides or polyimide-based plastics. The terminal block 102 includes a respective terminal divider 144 between each adjacent pair of the plurality of bores 104 and extending in an outward direction, opposite the inward direction in which the plurality of bores 104 extend, relative to the housing 106.

A method includes molding a plurality of electrically conductive terminal contacts (e.g. contacts 114) into a dielectric terminal block (e.g. terminal block 102). The flange of the pad 134 and the radial flange 146 extending outward from the terminal contact 114 mechanically secure the terminal contact 114 into the molded terminal block 102. The terminal block can be mounted to an electrical machine housing (e.g. housing 106), e.g. with the fasteners 108 of FIG. 1. Mounting the terminal block to an electrical machine housing can include soldering or brazing a respective lead wire (e.g. lead wires 110 of FIG. 3) into a solder cup (e.g. solder cup 120 of FIG. 3) of each of the terminal contacts, wherein each respective lead wire is a lead wire of a stator (e.g. stator 112) of an electrical machine inside the housing.

A potential benefit of systems and methods disclosed herein is that there only need be two connection points (in the solder cup 120, and in the lug receptacle 124). Those skilled in the art will readily appreciate that while three lead wires and respective terminal contacts 114 are shown, any suitable number of wires and terminal contacts can be used without departing from the scope of this disclosure.

The methods and systems of the present disclosure, as described above and shown in the drawings, provide for terminal blocks with superior properties including strike and creep clearance. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A terminal assembly comprising:
    a terminal block of a dielectric material defining a plurality of block bores therethrough;
    a terminal contact of an electrically conductive material being seated in each of the block bores defines an external terminal bore and an internal terminal bore, the external terminal bore being separated from the internal terminal bore by a divider wall, and the external terminal bore being receptive of a fastener; and
    a solder cup receptive of a lead wire being positioned within each of the internal terminal bores.

2. The assembly as recited in claim 1, further comprising a respective locking helical insert seated in the lug receptacle of each respective terminal contact, wherein the locking helical insert is configured to mechanically secure a respective lug to each terminal contact with a respective bolt threaded into each locking helical insert.

3. The assembly as recited in claim 2, further comprising the respective lug electrically and mechanically connected to each lug receptacle.

4. The assembly as recited in claim 1, wherein each terminal contact has an exterior facing pad in the form of a radially extending flange seated on an exterior surface of the terminal block for electrical contact with a respective lug.

5. The assembly as recited in claim 1, wherein a respective lead wire is soldered or brazed into each solder cup.

6. The assembly as recited in claim 5, wherein each respective lead wire is connected to an electrical machine stator on an interior side of the terminal bores.

7. The assembly as recited in claim 1, further comprising an electrical machine housing, wherein the terminal block is mounted to the electrical machine housing with each respective lug receptacle facing outward toward an exterior of the electrical machine housing.

8. The assembly as recited in claim 7, further comprising a respective o-ring seated about an exterior barrel of each of the bores through the terminal block, wherein the o-ring seals between the electrical machine housing and the terminal block.

9. The assembly as recited in claim 7, wherein the terminal block insulates between the housing and each terminal contact.

10. The assembly as recited in claim 1, wherein the terminal block is a single, monolithic, unitary body.

11. The assembly as recited in claim 1, wherein the dielectric material is plastic.

12. The assembly as recited in claim 11, wherein the plastic is polyamide-imides or polyimide-based plastic.

13. The assembly as recited in claim 1, wherein the terminal block includes a respective terminal divider between each adjacent pair of the plurality of bores and extending in an outward direction, opposite a direction in which the plurality of bores extend.

* * * * *